United States Patent [19]

Corcoran, Jr.

[11] Patent Number: 5,652,000
[45] Date of Patent: Jul. 29, 1997

[54] PELLETIZER PARTICULARLY SUITABLE FOR PELLETIZING WATER-DISPERSIBLE MELT-EXTRUDATE

[75] Inventor: William Robert Corcoran, Jr., Kennett Square, Pa.

[73] Assignee: E. I. Du Pont de Nemours and Company, Wilmington, Del.

[21] Appl. No.: 542,859

[22] Filed: Oct. 13, 1995

Related U.S. Application Data

[63] Continuation-in-part of Ser. No. 357,618, Dec. 15, 1994, abandoned.

[51] Int. Cl.[6] ................................................. B29B 11/10
[52] U.S. Cl. ......................... 425/311; 264/142; 425/72.1; 425/227; 425/232; 425/313
[58] Field of Search .................................. 425/311, 313, 425/379.1, 308, 72.1, 227, 232; 264/141–143, 140, 118, 500, 555

[56] References Cited

U.S. PATENT DOCUMENTS

| | | | |
|---|---|---|---|
| 3,196,487 | 7/1965 | Snelling | 425/168 |
| 3,341,892 | 9/1967 | Mayner | 425/90 |
| 3,564,650 | 2/1971 | Irving | 425/72.1 |
| 3,753,637 | 8/1973 | Gasior et al. | 425/313 |
| 4,019,414 | 4/1977 | Thomas, Jr. et al. | 83/356.3 |
| 4,021,176 | 5/1977 | Dettmer et al. | 425/313 |
| 4,059,206 | 11/1977 | Ellwood | 425/311 |
| 4,065,289 | 12/1977 | Judd | 71/82 |
| 4,212,617 | 7/1980 | Bagdan et al. | 425/311 |
| 4,240,779 | 12/1980 | Turk | 264/142 |
| 4,269,584 | 5/1981 | Kroll et al. | 425/311 |
| 4,333,371 | 6/1982 | Matsuda | 83/169 |
| 4,374,082 | 2/1983 | Hochschild | 264/118 |
| 4,413,971 | 11/1983 | Nettleton | 425/311 |
| 4,461,737 | 7/1984 | Voss | 264/142 |
| 4,580,967 | 4/1986 | Gutierrez-Rubio | 264/142 |
| 4,663,099 | 5/1987 | Marven | 264/142 |
| 4,698,009 | 10/1987 | Marin et al. | 425/311 |
| 4,728,275 | 3/1988 | Dilullo et al. | 425/311 |
| 4,728,276 | 3/1988 | Pauley et al. | 425/67 |
| 4,818,450 | 4/1989 | Hall et al. | 264/555 |
| 4,942,842 | 7/1990 | Siegenthaler et al. | 425/311 |
| 5,052,912 | 10/1991 | Masao | 264/142 |
| 5,186,959 | 2/1993 | Tanaka | 425/215 |
| 5,265,507 | 11/1993 | Noda et al. | 264/143 |

FOREIGN PATENT DOCUMENTS

| | | | |
|---|---|---|---|
| 1 488 018 | 7/1967 | France | 425/311 |
| 55-90309 | 7/1980 | Japan | 264/142 |
| 56-148511 | 11/1981 | Japan | 264/142 |
| 5-169441 | 7/1993 | Japan . | |
| WO92/15197 | 9/1992 | WIPO . | |
| WO94/14527 | 7/1994 | WIPO | 264/142 |

Primary Examiner—Jeffery R. Thurlow

[57] ABSTRACT

A pelletizer particularly useful for pelletizing water-dispersible melt-extrudate, among other materials, delivered from an extruder through a die positioned in communication with the interior of the pelletizer housing. The pelletizer includes a rotor disposed inside the housing and knives mounted around the periphery of the rotor. The knives pelletize the melt-extrudate as the rotor rotates. A fluid supply system selectively delivers a fluid, such as air, to the knives when the knives are at a selected location in the housing. The selected location is preferably just past the inlet and can extend in a circumferential direction around the housing in the area of the housing which is near the outlet. The circumferential extent can vary according to the configuration of the knives and the fluid supply system. The fluid supply system supplies fluid in a radially outward direction and tangentially along the cutting edge of the knives so as to sweep the pellets from the knives, as well as cool the knives, the pellets and the interior components of the pelletizer. The selective delivery of fluid sweeps the pellets off the knives as close to the outlet as possible. This prevents fouling, as well as avoids undesirable cooling of the knives in proximity to the die, which could lower the temperature and interrupt the flow of the extrudate.

19 Claims, 6 Drawing Sheets

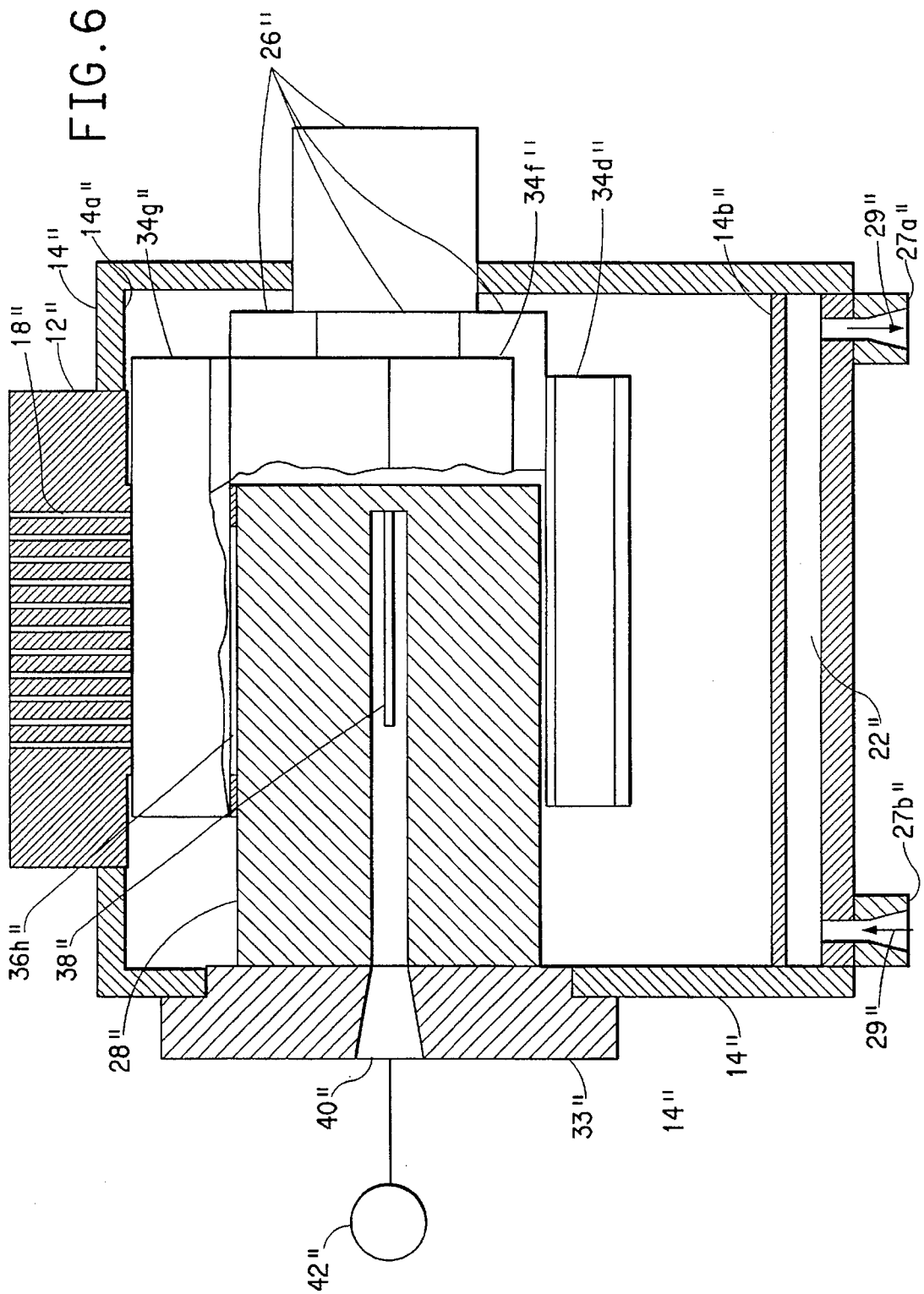

PELLETIZER PARTICULARLY SUITABLE FOR PELLETIZING WATER-DISPERSIBLE MELT-EXTRUDATE

This application is a continuation-in-part of U.S. application Ser. No. 08/357,618, filed Dec. 15, 1994, now abandoned.

BACKGROUND OF THE INVENTION

1. Field of the Invention

The present invention relates to a pelletizer for pelletizing a material. In particular, the present invention relates to a pelletizer for pelletizing a water-dispersible, which includes totally water-soluble, melt-extrudate.

2. Description of the Related Art

Melt-extrusion is an advantageous method for producing water-dispersible granular agricultural compositions. See, e.g., published PCT application number WO 9215197. One limitation to the commercial exploitation of this technology involves the inability of known pelletizers to pelletize water-dispersible melt-extrudate, since they are designed for use with water-insoluble materials and use water as a cooling medium. Typical of such pelletizers are those described in U.S. Pat. No. 3,341,892 to Maynet, in U.S. Pat. No. 3,753,637 to Gasior et al. and in U.S. Pat. No. 5,186,959 to Tanaka. Water-cooling is obviously unsuitable for water-dispersible melt-extrudate. Operation of such known pelletizers without any cooling would result in rapid fouling of the pelletizer, resulting from pellets being adhered to the pelletizer. Attempting to operate such known pelletizers by simply using air in place of water would be unsuccessful, because the cooling achieved by air is inadequate.

Pelletizers which use air cooling are also known. For example, Japanese Unexamined Patent Application Publication No. 5-169,441 discloses a pelletizer for pelletizing hot resin which has spraying holes formed in a nozzle die which spray a coolant, such as air, from the die face. The die face is disposed at the outer periphery of the rotor, and the cooling air is delivered in a radially inward direction. U.S. Pat. No. 4,212,617 to Bagdan et al. discloses an apparatus for cutting cheese strands which delivers cooling air through passages disposed in a shaft. The cooling air is delivered to an inner edge of a knife assembly, which is spaced from the cutting edge of the knife. Thus, although the devices of both Publication No. 5-169,441 and Bagdan et al. provide a way to cool the knives, neither device aids in sweeping the pellets off the knives in a configuration which prevents fouling of the pelletizer. To the contrary, in both these devices, as the rotor on which the knives are mounted rotates, centrifugal force causes the pellets to be flung out in all directions in the interior of the pelletizer, contributing to fouling of the pelletizer.

Thus, there exists a need for a pelletizer which is able to pelletize water-dispersible melt-extrudate and which, at the same time, aids in sweeping the pellets off the knives in a configuration which effectively prevents fouling of the pelletizer.

SUMMARY OF THE INVENTION

The present invention solves the problems of the prior art by providing effective air cooling of a pelletizer which is capable of pelletizing water-dispersible melt-extrudate. However, it should be noted that the pelletizer of the present invention provides effective air cooling for almost any material pelletized, as long as the material is capable of being extruded and is sufficiently brittle, or hard, to be cut into pellets at its melt extrusion temperature.

The present invention also solves the problems of the prior art by preventing fouling of a pelletizer by a number of mechanisms. In the present invention, cooling fluid, which cools the knives, the pellets and the interior of the pelletizer, is delivered to at least one knife in a radially outward direction and tangentially along the cutting edge of the knife so as to sweep the pellets off the knife. Moreover, the cooling fluid is delivered to the knife when the knife is at a location in the housing near the outlet of the pelletizer, thereby enhancing the chance that the pellets will be directed immediately to the outlet and will not be flung around inside the housing. In addition, the housing may be provided with fluid supply inlets which sweep the pellets along the walls of the housing toward the outlet, as well as provide additional cooling of the knives, the pellets and the interior components of the housing.

To achieve the foregoing solutions and in accordance with the purposes of the invention, as embodied and broadly described herein, there is provided a pelletizer for pelletizing a material comprising a rotor rotatable about an axis of rotation; at least one knife having a cutting edge mounted on the rotor for cutting the material into pellets as the rotor rotates; and means for supplying fluid in a radially outward direction and tangentially along the cutting edge of the knife so as to sweep the pellets from the knife.

Further in accordance with the purposes of the invention, there is provided a pelletizer for pelletizing a material comprising a housing; a rotor disposed in the housing and rotatable about an axis of rotation; at least one knife mounted on the rotor for cutting the material into pellets as the rotor rotates; and means for selectively supplying fluid through the rotor to the knife when the knife is at a selected location in the housing.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 6 is a partially cut-away view of the pelletizer of the third embodiment, with the top cover removed, taken across lines 6—6 of FIG. 5.

DETAILED DESCRIPTION OF THE PREFERRED EMBODIMENTS

Reference will not be made in detail to the present preferred embodiments of the invention, examples of which are illustrated in the accompanying drawings. Wherever possible, the same reference numbers will be used throughout the drawings to refer to the same or like parts.

In accordance with the invention, a first embodiment of the present invention comprises a pelletizer for pelletizing a material. Although the pelletizer of the present invention is particularly suitable for pelletizing water-dispersible, which includes totally water-soluble, melt-extrudate, the use of the present invention is not limited to this material. Thus, the pelletizer of the present invention could be used to pelletize almost any material, as long as the material is capable of being extruded and is sufficiently brittle so as to be cut into pellets at its melt extrusion temperature. The pelletizer of the present invention is particularly suitable for materials that become brittle quickly after they are exposed to cooling fluid, because the material can be pelletized at the die face and cooled immediately thereafter, as will be explained below.

The pelletizer of the first embodiment will be described with respect to FIGS. 1 and 2. A pelletizer in accordance with the first embodiment is shown generally at 10 in FIGS. 1 and 2 in operating position at the die face of an extruder. A die is shown at 12 in FIGS. 1 and 2. The rest of the extruder which feeds the material to the die is not shown.

Figure 1:
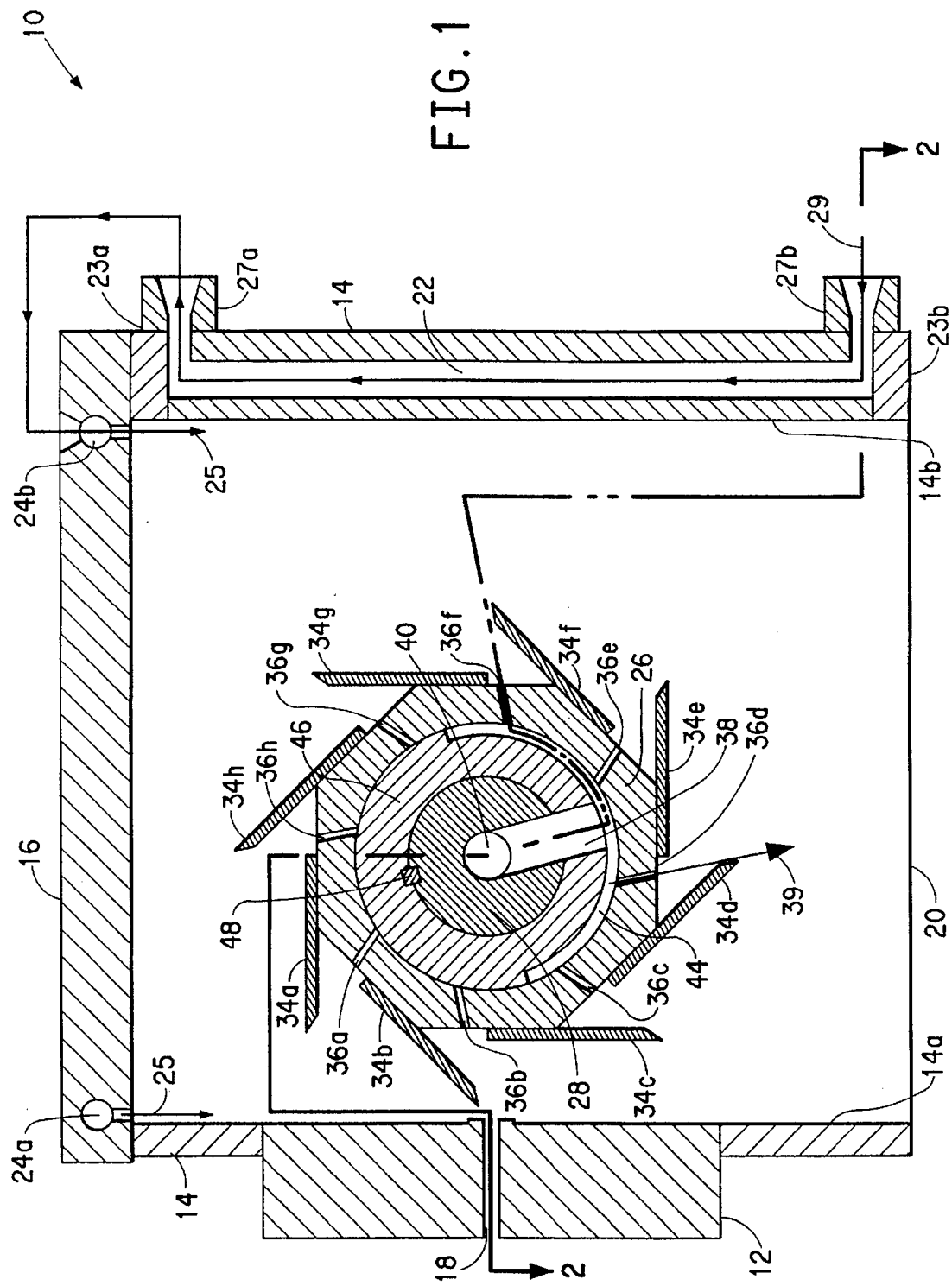
FIG. 1 is an elevational, cross-sectional view, taken across the center line of a die and a pelletizer according to a first embodiment of the present invention.
Figure 2:
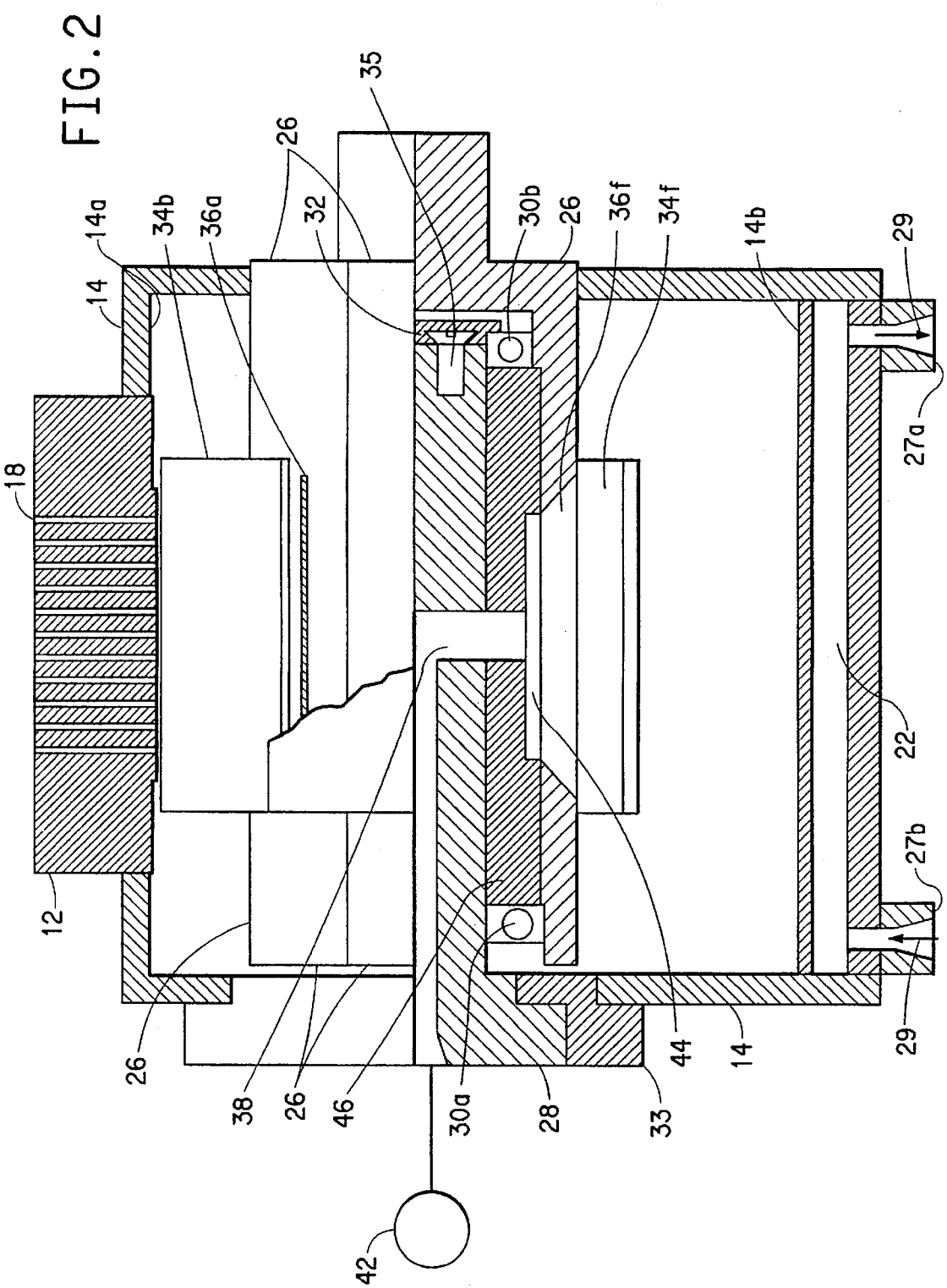
FIG. 2 is a partially cut-away view of the pelletizer of the first embodiment, with the top cover removed, taken across lines 2—2 of FIG. 1.

The pelletizer of the first embodiment comprises a housing 14 as shown in FIGS. 1 and 2. Housing 14 has an interior front wall 14a and an interior rear wall 14b as shown in FIGS. 1 and 2. Housing 14 also includes a top cover 16 as shown in FIG. 1 for covering the top of the housing. Die 12 is disposed in the housing as shown in FIGS. 1 and 2. As shown in particular in FIG. 2, die 12 has a plurality of holes 18 formed therein, only one being shown in FIG. 1. For convenience sake, only one hole is labeled in FIG. 2. A material, such as melt-extrudate, issues from holes 18, which comprise the inlet to the housing. The housing also includes an outlet 20. A cooling chamber 22 is included in one side of the housing as shown in FIGS. 1 and 2, and cools interior rear wall 14b of the housing. The housing and the cooling chamber are of a welded construction, with a top capping plate 23a and a bottom capping plate 23b as shown in FIG. 1 which seal the chamber. In addition, a block 27a is provided on the side of the housing at the top of the housing as shown in FIG. 1, which includes an outlet port for fluid flow. Similarly, a block 27a is provided at the bottom of the housing as shown in FIG. 1, which block includes an inlet port for fluid flow. The inlet and the outlet ports are shown as tapered, which depicts pipe thread fittings. The cooling fluid which passes through chamber 22 could be either air or liquid. A pair of fluid supply inlets 24a, 24b, as shown in FIG. 1, may be formed in housing top cover 16 for sweeping the pellets of the material along the interior wall of the housing. This sweeping action is illustrated by arrows 25 as shown in FIG. 1. In addition, the fluid supply inlets provide additional cooling to the interior of the pelletizer. As discussed above with respect to the first embodiment, if air is used in the cooling chamber, fluid supply inlet 24b as shown on the right-side of FIG. 1 is used in conjunction with the cooling chamber. In this case, cooling fluid enters the cooling chamber from a source (not shown) and is directed into block 27b via arrow 29. The cooling fluid exits the cooling chamber through upper block 27a and is supplied to fluid supply inlet 24b, so that the fluid from cooling chamber 22 sweeps the pellets of the material along the interior wall of the housing. If liquid is used in the cooling chamber, then the cooling chamber is blocked off from supply inlet 24b, and air is separately supplied through port 27a and through inlet 24b for cooling and sweeping the pellets of material as discussed above.

The pelletizer of the first embodiment also comprises a rotor disposed in the housing and rotatable about an axis of rotation. A rotor 26 is shown in FIGS. 1 and 2 disposed in housing 14. A shaft 28 is disposed along the axis of rotation of the rotor, and the rotor rotates about the shaft. Preferably, shaft 28 is stationary and does not rotate with the rotor. The rotor is rotated by any known means connected to the end of the shaft projecting through housing 14 as shown in FIG. 2, such as a motor and a coupling, or a connecting belt, not shown. Rotor 26 is journaled at each end by a respective bearing 30a and 30b as shown in FIG. 2. An end cap 32 is provided between bearing 30b and rotor 26 as shown in FIG. 2. End cap 32 is bolted to the shaft by a bolt 35 and holds bearing 30b in place against the shaft. A shaft cap 33 as shown in FIG. 2 separates the shaft from the exterior of the housing and provides quick access to the interior of the housing.

The pelletizer of the first embodiment also comprises at least one knife having a cutting edge and mounted on the rotor for cutting the material into pellets as the rotor rotates. The at least one knife could be a single knife, or a plurality of knives. The number of knives depends on how fast the material exits the die face and the speed at which the rotor rotates. Preferably at least two knives are used. Eight knives, such as knives 34a–34h, are shown in FIG. 1. The knives are securely arranged on the rotor at cutting angles so as to cut the material emerging from the die at the die face.

The present invention recognizes the fact that centrifugal force, created by the rotating rotor tends to fling the pellets, after they have been cut, radially outwardly. However, the present invention also recognizes that the pellets will tend to drop by the force of gravity towards the outlet. With the configuration of the present invention, the pellets are able to exit the housing as quickly as possible. This averts the possibility that they will be flung around the interior of the pelletizer, thereby preventing fouling. Thus, in accordance with the present invention, the pelletizer of the first embodiment also comprises means for selectively supplying fluid through the rotor to the knife when the knife is at a selected location in the housing. The selected location is preferably just past the inlet, and can extend in a circumferential direction around the housing in the area of the housing which is near the outlet. The circumferential extent can vary according to the configuration of the knives and the fluid supply means. In the configuration illustrated for the first embodiment in FIG. 1, this circumferential extent is about 180°. Alternatively, or in addition, the pelletizer of the first embodiment may also be described as comprising means for supplying fluid in a radially outward direction and tangentially along the cutting edge of the knife so as to sweep the pellets from the knife.

As embodied herein, the fluid supply means comprises a fluid supply system. The fluid supply system of the first embodiment of the present invention performs several functions. It cools the knives, the pellets and the components of the pelletizer interior to the housing. Moreover, because the fluid supply system supplies fluid in a radially outward direction and tangentially along the cutting edge of the knife, it provides the maximum possible force to sweep the pellets off the knife.

In the first embodiment of FIGS. 1 and 2, the fluid supply system includes a fluid port formed in the rotor adjacent each knife for supplying fluid to the knife. A fluid port 36a–36h as shown in FIG. 1 is formed in rotor 26 adjacent each respective knife 34a–34h. However, when, as noted above, only a single knife is used, only one fluid port is formed in the rotor. It is only necessary that a fluid port be provided adjacent each knife. The fluid ports can be of any suitable design necessary for delivering fluid to the knives. For example, an alternative design could be a series of holes formed in a radial line in the rotor, which would occupy the same radial area as a fluid port. In the first embodiment, fluid is supplied through fluid port 36d radially outwardly and tangentially along the cutting edge of the knife, as indicated at arrow 39 in FIG. 1.

In the first embodiment, the fluid supply system also includes a fluid supply channel disposed in the shaft. A fluid supply channel 38 is shown in FIGS. 1 and 2. The fluid supply system of the present invention further includes a fluid supply passage 40 connected at one end thereof to the fluid supply channel as shown in FIG. 1. Fluid supply passage 40 is adapted to be connected at the other end thereof to a source of fluid 42.

In the first embodiment of FIGS. 1 and 2, the fluid supply system also includes a trough disposed in fluid communication with the fluid supply channel and with the port in the rotor. A trough 44 is shown in FIGS. 1 and 2. Trough 44 supplies fluid to one or more fluid ports, and subsequently, to an associated knife. The circumferential extent of the trough is chosen so that there is no fluid flow to the knives when in proximity to the die. This is because cooling fluid could lower the temperature of the material and interrupt the flow of material from the die.

The pelletizer of the first embodiment further includes a sleeve disposed on the outer periphery of the shaft. A sleeve 46 is shown in FIGS. 1 and 2. The trough is formed on a portion of the outer periphery of the sleeve. Sleeve 46 is fixed to stationary shaft 28 by any suitable means, such as a key 48 as shown in FIG. 1.

When a water-dispersible, and in particular, a water-soluble, melt extrudate is pelletized, air must be used in the fluid supply system of the present invention. Preferably, the air has a low moisture content so as not to dissolve the extrudate. However, it is within the scope of the present invention to use other fluids, such as water, when materials which are not water-soluble are used. In addition to air, the cooling fluid may be any suitable gas, such as nitrogen, carbon dioxide and the like, or any combination thereof. No matter what fluid is used, the temperature of the fluid is usually below that of the extruded material, preferably ambient temperature, since this is the least expensive mode of operation. Alternatively, the fluid can be chilled below ambient temperature if it is desired to cool more quickly than when using fluid at ambient temperature.

In operation, material, such as melt-extrudate, is delivered to die 12 by an extruder and is fed through holes 18 to the interior of the housing to form strands of material. The strands are cut into pellets by the knife which is nearest the die, such as knife 34a as shown in FIG. 1. Since rotor 26 is rotating, each knife which successively arrives at the position that knife 34a occupies in FIG. 1 cuts the strands into pellets. As shown in FIG. 1, knives 34c–34f, or any knives which rotate into those respective positions as the rotor rotates, are in fluid communication with trough 44. In the first embodiment, cooling fluid, supplied by source 42 through passage 40 and channel 38 passes through trough 44 and is delivered to knives 34c–34f through an associated fluid port 36c–36f. The fluid ports direct fluid, such as air, radially outwardly and tangentially along the cutting edge of each knife so as to cool the knives, the pellets and the interior components of the housing, as well as to sweep the pellets from the knives. Fluid supply inlets 24a and 24b formed in housing top cover 16 may also be used to sweep the pellets along the wall of the housing, and to provide additional cooling. Fluid supply inlet 24b is supplied with air from cooling chamber 22, formed in the housing. Cooling fluid flows from a source, through the inlet port formed in block 27b, through chamber 22, through the outlet port formed in block 27a, and back to fluid supply inlet 24b. Alternatively, if liquid is used in the cooling chamber, then the cooling chamber is blocked off from supply inlet 24b, and air is separately supplied through port 27a and through inlet 24b for cooling and sweeping the pellets of material as discussed above. Once cut, the pellets drop downwardly through outlet 20 of housing 14 by virtue of gravity. The pellets may be collected on a conveyor, not shown, disposed outside the housing, which allows the pellets to cool further before being transferred by the conveyor to a collection bin, also not shown.

In accordance with a second embodiment of the present invention, there is provided a different version of a pelletizer for pelletizing a material. The pelletizer of the second embodiment will be described with respect to FIGS. 3 and 4, where components like those of the first embodiment will be designated with the same reference numeral as they were in FIGS. 1 and 2, but will include a prime ('). A pelletizer according to the second embodiment is shown generally at 10' in FIGS. 3 and 4 in operating position at the die face of an extruder. A die is shown at 12' in FIGS. 3 and 4. As in the first embodiment, the pelletizer of the second embodiment is particularly suitable for pelletizing water-dispersible melt-extrudate, but its use is not limited to this material.

Figure 3:
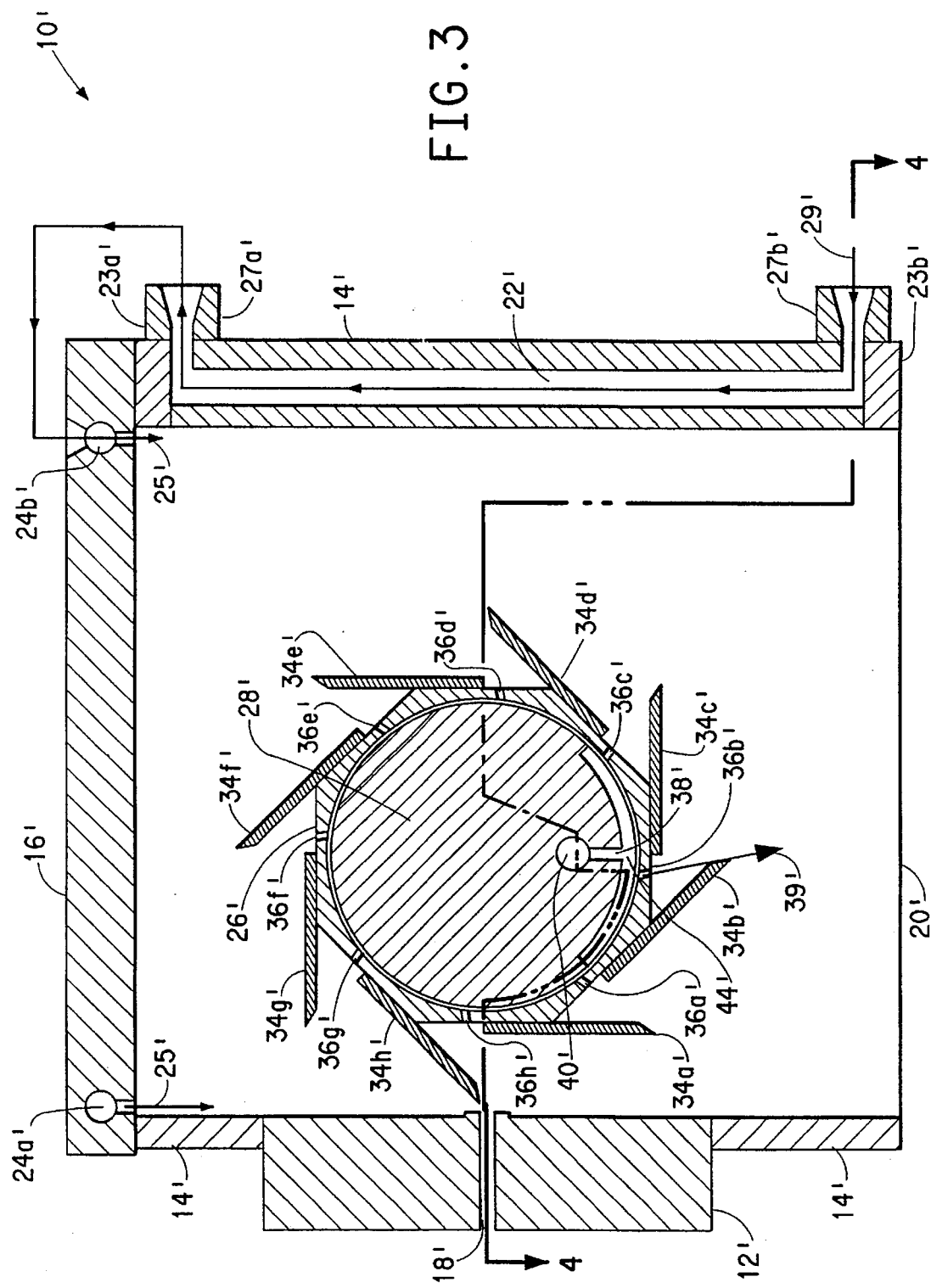
FIG. 3 is an elevational, cross-sectional view, taken across the center line of a die and a pelletizer according to a second embodiment of the present invention.
Figure 4:
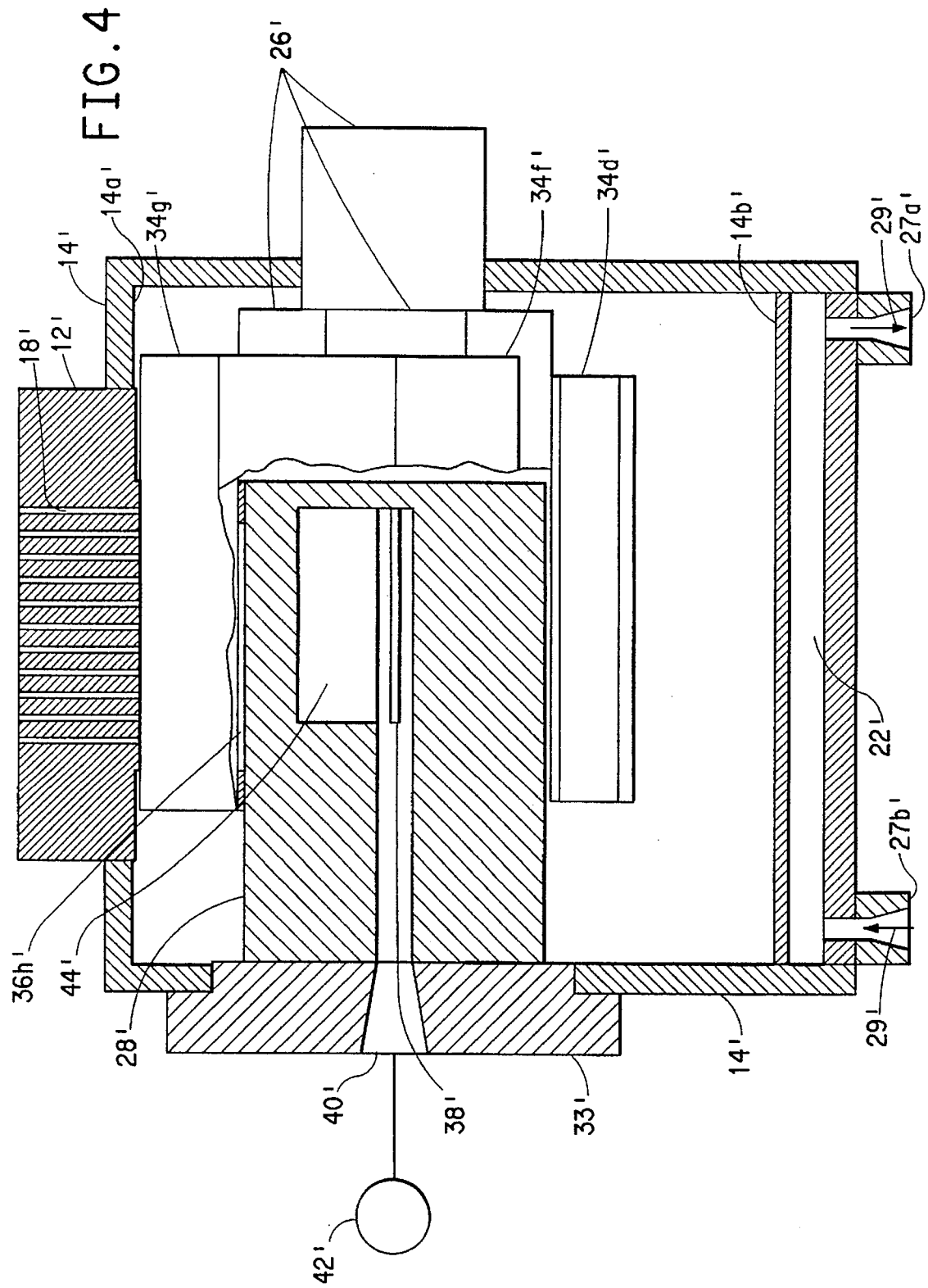
FIG. 4 is a partially cut-away view of the pelletizer of the second embodiment, with the top cover removed, taken across lines 4—4 of FIG. 3.

The pelletizer of the second embodiment comprises a housing 14' as shown in FIGS. 3 and 4. Housing 14' has an interior front wall 14a' and an interior rear wall 14b' as shown in FIGS. 3 and 4. Housing 14' also includes a top cover 16' as shown in FIG. 3 for covering the top of the housing. Die 12' is disposed in the housing as shown in FIGS. 3 and 4. As shown in particular in FIG. 4, die 12' has a plurality of holes 18' formed therein, only one being shown in FIG. 3. For convenience sake, only one hole is labeled in FIG. 4. A material, such as melt-extrudate, issues from holes 18', which comprise the inlet to the housing. The housing also includes an outlet 20'. A cooling chamber 22' which cools interior rear wall 14b of the housing is included in one side of the housing as shown in FIGS. 3 and 4. The housing and the cooling chamber are of a welded construction, with a top capping plate 23a' and a bottom capping 23b' as shown in FIG. 3 which seal the chamber. In addition, a block 27a' is provided on the side of the housing at the top of the housing as shown in FIG. 3, which includes an outlet port for fluid flow. Similarly, a block 27a' is provided at the bottom of the housing as shown in FIG. 3, which block includes an inlet port for fluid flow. As in the first embodiment, the inlet and the outlet ports are shown as tapered, which depicts pipe thread fittings. The cooling fluid which passes through chamber 22' could be either air or liquid. A pair of fluid supply inlets 24a', 24b' as shown in FIG. 3 may be formed in housing top cover 16' for sweeping the pellets of the material along the interior wall of the housing as described above with respect to the first embodiment. This sweeping action is illustrated by arrows 25' as shown in FIG. 3. If air is used in the cooling chamber, fluid supply inlet 24b' as shown on the right-side of FIG. 3 is used in conjunction with the cooling chamber. In this case, cooling fluid enters the cooling chamber from a source (not shown) and is directed into block 27b' via arrow 29'. The cooling fluid exits the cooling chamber through upper block 27a' and is supplied to fluid supply inlet 24b', so that the, fluid from cooling chamber 22' sweeps the pellets of the material along the interior wall of the housing. If liquid is used in the cooling chamber, then the cooling chamber is blocked off from supply inlet 24b', and air is separately supplied through port 27a' and through inlet 24b' for cooling and sweeping the pellets of material as discussed above.

The pelletizer of the second embodiment also comprises a rotor disposed in the housing and rotatable about an axis of rotation. A rotor 26' is shown in FIGS. 3 and 4 disposed in housing 14'. The pelletizer of the second embodiment also includes a shaft 28' disposed along the axis of rotation of the rotor, but spaced from the rotor, as can be seen from FIG. 4. The rotor is rotated by any known means connected to the end of the rotor projecting through housing 14' as shown in FIG. 4, such as a motor and a coupling, or a connecting belt, not shown. In this second embodiment, the rotor is cantilevered from this connection to rotate about shaft 28' without being journaled at either end thereof. A shaft cap 33' as shown in FIG. 4 separates the shaft from the exterior of the housing and provides quick access to the interior of the housing. As in the first embodiment, shaft 28' is preferably stationary.

The pelletizer of the second embodiment also comprises at least one knife having a cutting edge and mounted on the rotor for cutting the material into pellets as the rotor rotates. As in the first embodiment, the at least one knife could be a single knife, or a plurality of knives. Again, the number of knives depends on how fast the material exits the die face and the speed at which the rotor rotates. In this embodiment, preferably at least four knives are used. In FIG. 3, eight knives 34a–34h' are shown.

The pelletizer of the second embodiment also comprises for selectively supplying fluid through the rotor to the knife when the knife is at a selected location in the housing. This selected location is defined above with respect to the first embodiment, although in the second embodiment as illustrated in FIG. 3, the selected location extends about 90°. Alternatively, or in addition, the pelletizer of the second embodiment may be described as comprising means for supplying fluid in a radially outward direction and tangentially along the cutting edge of the knife so as to sweep the pellets from the knife. The fluid supply means of the second embodiment cools the knives, the pellets and the interior of the housing while preventing fouling as described above with respect to the first embodiment. As embodied herein, the fluid supply means of the second embodiment comprises a fluid supply system. As in the first embodiment, fluids other than air can be used with the fluid supply system of the second embodiment.

In the second embodiment of FIGS. 3 and 4, the fluid supply system comprises a fluid port formed in the rotor adjacent each knife. As shown in FIG. 3 in total, fluid ports 36a'–36h' are formed in rotor 26' adjacent each respective knife 34a'–34h'. Fluid is supplied through fluid port 36b' radially outwardly and tangentially along the cutting edge of the knife, as indicated at arrow 39'. As noted above with respect to the first embodiment, when only a single knife is used, only one fluid port is formed in the rotor. It is only necessary that a fluid port be provided adjacent each knife. The fluid ports can be of any suitable design necessary for delivering fluid to the knives, such as described above with respect to the first embodiment.

The fluid supply system of the second embodiment further includes a fluid supply channel disposed inside the shaft. A fluid supply channel 38' is shown in FIG. 3. The fluid supply system of the second embodiment further includes a fluid supply passage 40' connected at one end thereof to the fluid supply channel as shown in FIG. 3. Fluid supply passage 40' is adapted to be connected at the other end thereof to a source of fluid 42' as shown in FIG. 4.

In the second embodiment as illustrated in FIGS. 3 and 4, the fluid supply system also includes a trough disposed in fluid communication with the fluid supply channel and with the ports in the rotor. A trough is shown in FIGS. 3 and 4. Trough 44' is formed on a portion of the outer periphery of the shaft. In the preferred implementation of the second embodiment, only one fluid supply channel is used, and the trough disperses the fluid supply for a continuous flow. However, it should be noted that additional fluid supply channels could be used in the second embodiment for intermittent flow, if no trough is used. As in the first embodiment, the circumferential extent of the trough of the second embodiment is chosen so that there is no fluid flow to the knives when in proximity to the die.

In operation, material, such as melt-extrudate, is delivered to die 12' by an extruder and is fed through holes 18' to the interior of the housing to form strands of material. The strands are cut into pellets by the knife which is nearest the die, such as knife 34h' as shown in FIG. 3. Since rotor 26' is rotating, each knife which successively arrives at the position that knife 34h' occupies in FIG. 3 cuts the strands into pellets. As shown in FIG. 3, knives 34b' and 34c', or any knives which rotate into those respective positions as the rotor rotates, are in fluid communication with trough 44'. In the second embodiment, cooling fluid, supplied by source 42' through passage 40' and channel 38', passes through trough 44' and is delivered to knives 34b' and 34c' through an associated fluid port 36b' and 36c'. The fluid ports direct fluid, such as air, in a radially outward direction and tangentially along the cutting edge of the knife so as to cool the knives, the pellets and the interior components of the housing, as well as sweep the pellets from the knives. As in the first embodiment, fluid supply inlets 24a' and 24b' formed in housing top cover 16' may also be used to sweep the pellets along the wall of the housing, and to provide additional cooling. Fluid supply inlet 24b' is supplied with air from cooling chamber 22', formed in the housing. Cooling fluid flows from a source, through the inlet port formed in block 27b', through chamber 22', through the diverging chamber formed in block 27a', and back to fluid supply inlet 24b'. Alternatively, if liquid is used in the cooling chamber, then the cooling chamber is blocked off from supply inlet 24b', and air is separately supplied through port 27a' and through inlet 24b' for cooling and sweeping the pellets of material as discussed above. Once cut, the pellets drop downwardly through housing 14' and to a conveyor, if used, as described above with respect to the first embodiment.

It should be noted that the pelletizer of the second embodiment is a modified version of a pelletizer which is commercially available from Werner & Pfleiderer, of Ramsey, N.J. as Model Number MWG 40. The rotor of the commercially available pelletizer was modified by making it eight-sided, rather than four-sided as in the commercially available version. The knives of this commercially available pelletizer were modified to suit the new configuration of the rotor. Shaft 28' was also added, and passage 40', channel 38' and trough 44' were formed therein in order to introduce fluid. Port cover 33' was added in order to accommodate the addition of the shaft. In addition, cooling chamber 22', and associated capping plates 23a', 23b', blocks 27a', 27b' and fluid supply inlets 24a', 24b' were added to the housing of the commercially available pelletizer.

In accordance with a third embodiment of the present the invention, there is provided another version of a pelletizer for pelletizing a material. The pelletizer of the third embodiment will be described with respect to FIGS. 5 and 6, where components like those of the first and second embodiments will be designated with the same reference numeral as they were in FIGS. 1–4, as appropriate, but will include a double prime ("). A pelletizer according to the third embodiment is shown generally at 10" in FIGS. 5 and 6 in operating position at the die face of an extruder. A die is shown at 12" in FIGS. 5 and 6. As in the first two embodiments, the pelletizer of the third embodiment is not limited to use with a water-dispersible material, although it is particularly useful for this material.

Figure 5:
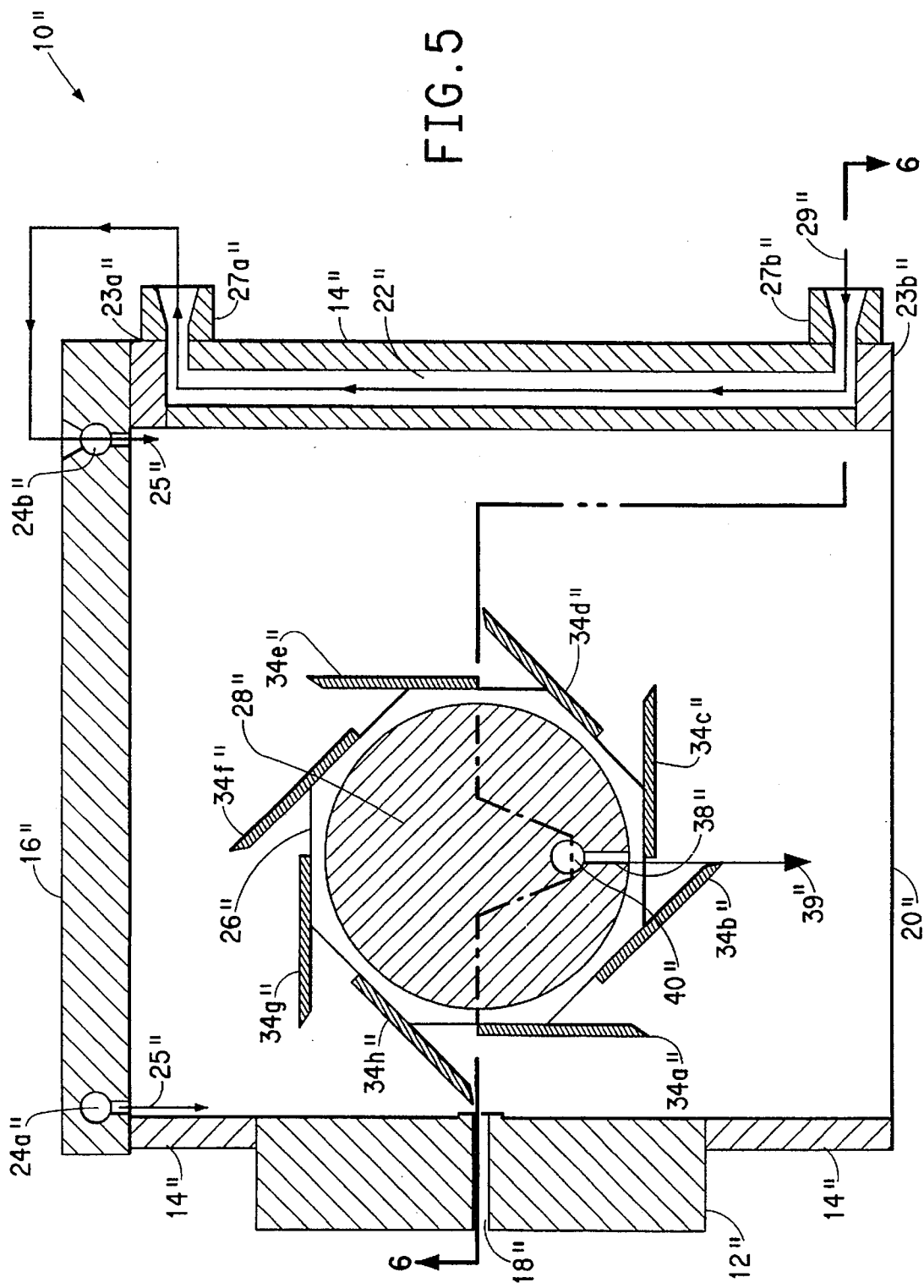
FIG. 5 is an elevational, cross-sectional view, taken across the center line of a die and a pelletizer according to a third embodiment of the present invention.

The pelletizer of the third embodiment comprises a housing 14" as shown in FIGS. 5 and 6. Housing 14" has an interior front wall 14a" and an interior rear wall 14b" as shown in FIGS. 5 and 6. Housing 14" also includes a top cover 16" as shown in FIG. 5 for covering the top of the housing. Die 12" is disposed in the housing as shown in FIGS. 5 and 6. As shown in particular in FIG. 6, die 12" has a plurality of holes 18" formed therein, only one being shown in FIG. 5. For convenience sake, only one hole is labeled in FIG. 6. A material, such as melt-extrudate, issues from holes 18", which comprise the inlet to the housing. The housing also includes an outlet 20". A cooling chamber 22", which cools the interior rear wall 14b" as shown in FIGS. 3 and 4, is included in one side of the housing as shown in FIGS. 5 and 6. As in the above embodiments, the housing and the cooling chamber are of a welded construction, with a top capping plate 23a" and a bottom capping plate 23b" as shown in FIG. 5 which seal the chamber. In addition, a block 27a" is provided on the side of the housing at the top of the housing as shown in FIG. 5, which includes an outlet port for fluid flow. Similarly, a block 27a" is provided at the bottom of the housing as shown in FIG. 5, which block includes an inlet port for fluid flow. As in the above embodiments, the inlet and the outlet ports are shown as tapered, which depicts pipe threaded fittings. The cooling fluid which passes through chamber 22" could be either air or liquid. A pair of fluid supply inlets 24a", 24b", as shown in FIG. 5, may be formed in housing top cover 16" for sweeping the pellets of the material along the interior wall of the housing as described above with respect to the first embodiment. This sweeping action is illustrated by arrows 25" as shown in FIG. 5. In addition, the fluid supply inlets 24a", 24b" provide additional cooling to the interior of the pelletizer. As discussed with respect to the above embodiments, if air is used in the cooling chamber, fluid supply inlet 24b" as shown on the right-side of FIG. 1 is used in conjunction with the cooling chamber. In this case, cooling fluid enters the cooling chamber from a source (not shown) and is directed into block 27b" via arrow 29". The cooling fluid exits the cooling chamber through upper block 27a" and is supplied to fluid supply inlet 24b", so that the fluid from cooling chamber 22" sweeps the pellets of the material along the interior wall of the housing. If liquid is used in the cooling chamber, then the cooling chamber is blocked off from supply inlet 24b", and air is separately supplied through port 27a" and through inlet 24b" for cooling and sweeping the pellets of material as discussed above.

The pelletizer of the third embodiment also comprises a rotor disposed in the housing and rotatable about an axis of rotation. A rotor 26" is shown in FIGS. 5 and 6 disposed in housing 14". As in the second embodiment, shaft 28" extends only partially along the axial length of the housing, and stops short of the rotor as can be seen from FIG. 6. A shaft cap 33" as shown in FIG. 6 separates the shaft from the exterior of the housing and provides quick access to the interior of the housing. Preferably, shaft 28" is stationary. The rotor is rotated by any known means connected to the end of the rotor projecting through housing 14" as shown in FIG. 6, such as a motor and a coupling, or a connecting belt, not shown.

The pelletizer of the third embodiment also comprises at least one knife having a cutting edge and mounted on the rotor for cutting the material into pellets as the rotor rotates. As in the first two embodiments, the at least one knife could be a single knife, or a plurality of knives. Again, the number of knives depends on how fast the material exits the die face and the speed at which the rotor rotates. In this embodiment, preferably at least two knives are used. Eight knives 34a'–34h' are shown in FIG. 5. In the third embodiment, only the knives are cantilevered from the rotor to rotate about shaft 28", as opposed to the second embodiment, where the rotor, with the knives attached, is cantilevered.

The pelletizer of the third embodiment also comprises for selectively supplying fluid through the rotor to the knife when the knife is at a selected location in the housing. This selected location is defined above with respect to the first embodiment, although in the third embodiment as illustrated in FIG. 5, the selected location extends the circumferential length of fluid supply channel 38", as will be described below. Alternatively, or in addition, the pelletizer of the third embodiment may be described as comprising means for supplying fluid in a radially outward direction and tangentially along the cutting edge of the knife so as to sweep the pellets from the knife. The fluid supply means of the third embodiment cools the knives, the pellets and the interior of the housing while preventing fouling, as described above with respect to the first embodiment. As embodied herein, the fluid supply means of the third embodiment comprises a fluid supply system. As in the first two embodiments, fluids other than air can be used with the fluid supply system of the third embodiment.

In the third embodiment of FIGS. 5 and 6, the fluid supply system includes a fluid supply channel disposed in the shaft. A fluid supply channel 38" is shown in FIG. 5. In the third embodiment, it is the position of the fluid supply channel which is chosen so that there is no fluid flow to the knives when in proximity to the die in order to prevent lowering the temperature of the material and interrupting the flow of material from the die as discussed above with respect to the first two embodiments. Fluid is supplied radially outwardly through channel 38" and tangential to the cutting edge of the knife, as indicated at arrow 39".

The fluid supply system of the third embodiment further includes a fluid supply passage disposed in fluid communication with the fluid supply channel and adapted to be connected to a source of fluid. A fluid supply passage 40" is shown in FIGS. 5 and 6 in communication with fluid supply channel 38". Fluid supply passage 40" is adapted to be connected to a source of fluid 42" as shown in FIG. 6.

In operation, material, such as melt-extrudate, is delivered to die 12" by an extruder and is fed through holes 18" to the interior of the housing to form strands of material. The strands are cut into pellets by the knife which is nearest the die, such as knife 34h" as shown in FIG. 5. Since rotor 26" is rotating, each knife which successively arrives at the position that knife 34h" occupies in FIG. 5 cuts the strands into pellets. As shown in FIG. 5, knife 34c", or any knives that rotate into that position as the rotor rotates, is in fluid communication with fluid supply channel 38". In the third embodiment, cooling fluid, supplied by source 42" through passage 40", passes through channel 38" and is delivered to knife 34c". The channel directs fluid, such as air, radially outwardly and tangentially along the cutting edge of the knife so as to cool the knives, the pellets and the interior components of the housing, as well as sweep the pellets from the knives. As in the first two embodiments, fluid supply inlets 24a" and 24b" formed in housing top cover 16" may also be used to sweep the pellets along the wall of the housing, and to provide additional cooling. Fluid supply inlet 24b" is supplied with air from cooling chamber 22", formed in the housing. Cooling fluid flows from a source, through the inlet port formed in block 27b", through chamber 22", through the outlet port formed in block 27a", and back to fluid supply inlet 24b". Alternatively, if liquid is used in the cooling chamber, then the cooling chamber is blocked off from supply inlet 24b", and air is separately supplied through port 27a" and through inlet 24b" for cooling and sweeping the pellets of material as discussed above. Once cut, the pellets drop downwardly through housing 14" and to a conveyor, if used, as described above with respect to the first embodiment.

The pelletizer of the third embodiment is also a modified version of pelletizer Model Number MWG 40, commercially available from Werner & Pfleiderer. The modifications made to the commercially available pelletizer to achieve the pelletizer of the third embodiment are similar to the modifications made to achieve the pelletizer of the second embodiment. The rotor of the commercially available pelletizer was modified by making it eight-sided, rather than four-sided as in the commercially available version. The knives of this commercially available pelletizer were modified to suit the new configuration of the rotor. Shaft 28" was also added, and passage 40" and channel 38" were formed therein in order to introduce fluid. Port cover 33" was added in order to accommodate the addition of the shaft. In addition, cooling chamber 22", and associated capping plates 23a", 23b", blocks 27a", 27b" and fluid supply inlets 24a", 24b" were added to the housing of the commercially available pelletizer.

It will be apparent to those skilled in the art that various modifications and variations can be made in the construction of the pelletizer of the first through third embodiments of the present invention without departing from the scope or spirit of the invention. As an example, the shaft may not necessarily be stationary, but only need rotate at a different speed than the rotor, so that the fluid supply system delivers fluid to the knives at the selected location in the housing. This is true as long as there are one, two, or some even multiple of the ratio of the knife rotating speed to the number of knives, so that air is supplied in the same location at all times.

Other embodiments of the invention will be apparent to those skilled in the art from consideration of the specification and practice of the invention disclosed herein. It is intended that the specification be considered as exemplary only, with a true scope and spirit of the invention being indicated by the following claims.

What is claimed is:

1. A pelletizer for pelletizing a material, comprising:
   (a) a housing having a die disposed therein, the die having at least one inlet hole, wherein the material is delivered into the housing at a face of the die through the hole;
   (b) a rotor disposed in the housing and rotatable about an axis of rotation;
   (c) at least one knife having a cutting edge and mounted on the rotor for cutting the material into pellets as the rotor rotates; and
   (d) means disposed in the housing at a location downstream of the inlet hole of the die with respect to the direction of rotation of the rotor for supplying fluid to the cutting edge of the knife at the downstream location and radially outwardly and tangentially along the cutting edge of the knife so as to sweep the pellets from the knife.

2. A pelletizer for pelletizing a material, comprising:
   (a) a housing having a die disposed therein, the die having at least one inlet hole, wherein the material is delivered into the housing at a face of the die through the hole;
   (b) a shaft disposed along the axis of rotation of the rotor and projecting from the housing;
   (c) a rotor rotatable about the shaft;
   (d) at least one knife mounted on the rotor for cutting the material into pellets; and
   (e) means disposed in the housing at a location downstream of the inlet hole of the die with respect to the direction of rotation of the rotor for selectively supplying fluid through the rotor to the knife when the knife is at the downstream location.

3. The pelletizer of claims 1 or 2, further including a housing surrounding the rotor, wherein the housing has a front interior wall and a rear interior wall.

4. The pelletizer of claim 3, wherein the housing has a cooling chamber for cooling the rear interior wall of the housing.

5. The pelletizer of claim 3, further including a fluid supply inlet formed in the housing for sweeping the pellets of the material along the wall of the housing.

6. The pelletizer of claim 5, wherein the housing has a cooling chamber for cooling the rear interior wall of the housing, and further including a fluid supply inlet formed in the housing in fluid communication with the cooling chamber for sweeping the pellets of the material along the wall of the housing.

7. The pelletizer of claim 1, wherein the fluid supply means comprises a fluid supply system.

8. The pelletizer of claim 2, wherein the fluid supply means comprises a fluid supply system.

9. The pelletizer of claims 7 or 8, further including a shaft disposed along the axis of rotation of the rotor.

10. The pelletizer of claim 9, wherein the fluid supply means includes a fluid supply channel disposed inside the shaft.

11. The pelletizer of claim 10, wherein the fluid supply system further includes a fluid supply passage connected at one end thereof to the supply channel and adapted to be connected at the other end thereof to a source of fluid.

12. The pelletizer of claims 7 or 8, wherein the fluid supply system includes a fluid port disposed in the rotor adjacent the knife for supplying fluid to the knife.

13. The pelletizer of claim 12, wherein the fluid supply system further includes a trough disposed in fluid communication with the fluid supply channel and with the port in the rotor.

14. The pelletizer of claim 13, further including a sleeve disposed on the outer periphery of the shaft, wherein the trough is formed on a portion of the outer periphery of the sleeve.

15. The pelletizer of claim 14, wherein the shaft is stationary and the sleeve is fixed to the stationary shaft, so that as the rotor rotates, the trough is in communication with the fluid port.

16. The pelletizer of claim 13, wherein the trough is formed on a portion of the outer periphery of the shaft.

17. The pelletizer of claims 1 or 2, wherein the rotor is cantilevered.

18. The pelletizer of claims 1 or 2, wherein the knife is cantilevered.

19. A pelletizer for pelletizing water-soluble melt-extrudate, comprising:
- (a) a housing having a die disposed therein, the die having at least one inlet hole, wherein the material extrudes through the hole and into the housing at a face of the die;
- (b) a rotor disposed in the housing and rotatable about an axis of rotation;
- (c) a plurality of knives mounted on the outer periphery of the rotor;
- (d) a plurality of ports formed in the rotor, wherein a knife is associated with each port;
- (e) a stationary shaft disposed interior to the rotor;
- (f) an air supply passage formed in the shaft;
- (g) an air supply channel formed in the shaft and disposed in fluid communication with the air supply passage;
- (h) a sleeve disposed around the outer periphery of the rotor, the air supply channel extending through the sleeve; and
- (i) a trough disposed on a portion of the outer periphery of the sleeve at location downstream of the inlet hole of the die with respect to the direction of rotation of the rotor and in fluid communication with the air supply channel and the ports for supplying air to the knives through the ports when at least one knife is at the downstream location.

* * * * *

UNITED STATES PATENT AND TRADEMARK OFFICE
CERTIFICATE OF CORRECTION

PATENT NO. : 5,652,000
DATED : JULY 29, 1997
INVENTOR(S) : WILLIAM ROBERT CORCORAN, JR.

It is certified that error appears in the above-identified patent and that said Letters Patent is hereby corrected as shown below:

In column 1, line 25, replace "Maynet" with --Mayner--.

In column 3, line 43, replace "27*a*" with --27*b*--. Also in column 3, line 65, replace "27*a*" with --24*a*--.

In column 6, line 9, replace "27*a*" with --24*a*--. Also in column 6, line 49, replace "27*a*'" with --27*b*'--.

In column 7, line 4, replace "27*a*'" with --24*a*'--.

In column 8, line 46, replace "27*a*'" with --24*a*'--.

In column 9, line 33, replace "27*a*''" with --27*b*''--. Also in column 9, line 58, replace "27*a*''" with --24*a*''--.

In column 11, line 15, replace "27*a*''" with --24*a*''--.

In column 12, lines 21 and 22, replace "3. The pelletizer of claims 1 or 2, further including a housing surrounding the rotor, wherein the housing has a" with --3. The pelletizer of claims 1 or 2, wherein the housing has a --. Also in column 12, line 29, after the second occurrence of the word "the" please delete "wall" and add --front interior and rear interior walls--.

In column 14, line 9, after the word "at" please add --a--.

Signed and Sealed this

Ninth Day of June, 1998

BRUCE LEHMAN

Attest:

Attesting Officer

Commissioner of Patents and Trademarks